United States Patent [19]

Abraham

[11] Patent Number: 5,161,223
[45] Date of Patent: Nov. 3, 1992

[54] RESUMEABLE BATCH QUERY FOR PROCESSING TIME CONSUMING QUERIES IN AN OBJECT ORIENTED DATABASE MANAGEMENT SYSTEM

[75] Inventor: Robert L. Abraham, Marietta, Ga.

[73] Assignee: International Business Machines Corporation, Armonk, N.Y.

[21] Appl. No.: 425,829

[22] Filed: Oct. 23, 1989

[51] Int. Cl.$^5$ .................................. G06F 15/40
[52] U.S. Cl. .................. 395/600; 395/650; 364/DIG. 1
[58] Field of Search ... 364/200 MS File, 900 MS File; 395/600, 650

[56] References Cited

U.S. PATENT DOCUMENTS

| | | | |
|---|---|---|---|
| 4,506,326 | 3/1985 | Shaw et al. | 364/900 |
| 4,509,119 | 4/1985 | Gumaer et al. | 364/200 |
| 4,604,686 | 8/1986 | Reiter et al. | 364/200 |
| 4,631,664 | 12/1986 | Bachman | 364/200 |
| 4,642,762 | 2/1987 | Fisanick | 364/200 |
| 4,747,072 | 5/1988 | Robinson et al. | 364/900 |
| 4,769,772 | 9/1988 | Dwyer | 364/200 |
| 4,791,550 | 12/1988 | Stevenson et al. | 364/200 |
| 4,811,199 | 3/1989 | Kuechler et al. | 364/200 |
| 4,821,220 | 4/1989 | Duisberg | 364/578 |
| 4,841,433 | 6/1989 | Hakim et al. | 364/200 |
| 4,853,843 | 8/1989 | Ecklund | 364/200 |
| 4,884,217 | 11/1989 | Skeirik et al. | 364/513 |
| 4,930,071 | 5/1990 | Tou et al. | 364/200 |
| 4,953,080 | 8/1990 | Dysart et al. | 364/200 |
| 4,956,774 | 9/1990 | Shibamiya et al. | 364/200 |
| 5,043,872 | 8/1991 | Cheng et al. | 364/200 |
| 5,058,002 | 10/1991 | Nakamura | 364/200 |

OTHER PUBLICATIONS

IBM Technical Disclosure Bulletin, "Dynamic Positioning Of Object Data Portions Within A Single Presentation Area", pp. 231-232, vol. 31, No. 11, Apr. 1989.

IBM Technical Disclosure Bulletin, "Rules For Interchange Objects In A Mixed Object Document Data Stream", pp. 196-197, vol. 32, No. 1, Jun. 1989 Apr. 1989.

*Primary Examiner*—Gareth D. Shaw
*Assistant Examiner*—Dennis M. Butler
*Attorney, Agent, or Firm*—Bell, Seltzer, Park & Gibson

[57] ABSTRACT

A resumeable batch query object class provides a link between a first dialog for obtaining information regarding a query to be performed by an object oriented database management system, a second dialog for manipulating the results of the query, and the stream which includes the query results. The resumeable batch query attributes include identifiers of the second dialog and the stream, and a method to run the query. The resumable batch query is used by the object oriented database management system to allow a second dialog to manipulate results of a batch or background query in the same manner as results of a foreground or interactive query. Time consuming queries may thereby be processed in background mode in a manner which is transparent to the second dialog.

17 Claims, 7 Drawing Sheets

```
┌─────────────────────────────────────────────────┐─┐
│ [0]              [1] SEARCH...                  │ │
│                                                 │ │
│         MASS UPDATE (PANEL31)                   │ │
│                                                 │ │
│                                                 │ │
│      [2] ┌─────────────────────────────────┐    │ │
│          │ ITEM SELECTION CRITERIA (PANEL32)│   │ │
│          │                                  │   │ │
│          │    ITEM TYPE............ [    ]  │   │ │
│          │    ITEM STATUS CODE..... [    ]  │   │ │
│          └─────────────────────────────────┘    │ │
│                                                 │ │
└─────────────────────────────────────────────────┘ │
                                                    │
      [3]  · · · · · · · · · · · · ·                │
           ·  - DO QUERY           ·                │
           · · · · · · · · · · · · ·                │
                                                    │
┌─────────────────────────────────────────────────┐ │
│ [4]  [5] MARK    [6] ENTER UPDATE FIELDS...     │ │
│                                                 │ │
│           ITEM DATA SELECT LIST (PANEL91)       │ │
│                                                 │ │
│      XYZ123    EC4032      C    P    BEARING    │ │
│      QW4096    EC0230      B    Q    BEARING    │ │
│      UIOP54    EC9876      C    Q    BEARING    │ │
│                                                 │ │
│      [7] ┌─────────────────────────────────┐    │ │
│          │      MASS UPDATE (PANEL92)       │   │ │
│          │                                  │   │ │
│          │       FIELD       NEW VALUE      │   │ │
│          │      [     ]      [      ]       │   │ │
│          │      [     ]      [      ]       │   │ │
│          │      [     ]      [      ]       │   │ │
│          └─────────────────────────────────┘    │ │
│                                                 │ │
└─────────────────────────────────────────────────┘─┘

[8]  · · · · · · · · · · · · ·
           ·  - DO UPDATES·
           · · · · · · · · · · · · ·
```

FIG. 8.

| 0 | | 1 SEARCH IN BATCH... |

MASS UPDATE (PANEL31)

| 2 | ITEM SELECTION CRITERIA (PANEL32) |
ITEM TYPE.................. [ ]
ITEM STATUS CODE........... [ ]

- 3A – SUBMIT QUERY
- 3B – QUERY RUNS IN BATCH
- 3C – RESULTS PUT IN USER IN-BASKET

| 3D | DISPLAY |

IN BASKET (PANEL57)

| OBJECT NAME | OBJECT TYPE | DATE |
|---|---|---|
| >MASS UPDATE: RESP='BUCKEYE' | RBQ | 05/16/89 |

| 4 | 5 MARK | 6 ENTER UPDATE FIELDS... |

ITEM DATA SELECT LIST (PANEL91)

| XYZ123 | EC4032 | C | P | BEARING |
| QW4096 | EC0230 | B | Q | BEARING |
| UIOP54 | EC9876 | C | Q | BEARING |

| 7 | MASS UPDATE (PANEL92) |

FIELD        NEW VALUE
[     ]      [     ]
[     ]      [     ]

- 8 – DO UPDATES

FIG. 9.

RESUMEABLE BATCH QUERY FOR PROCESSING TIME CONSUMING QUERIES IN AN OBJECT ORIENTED DATABASE MANAGEMENT SYSTEM

FIELD OF THE INVENTION

This invention relates to an object oriented database management system and more particularly to a process and apparatus for interactively handling time consuming interactive queries in an object oriented database management system.

BACKGROUND OF THE INVENTION

Object Oriented Programming systems and processes have been the subject of much investigation and interest in state of the art data processing environments. Object Oriented Programming is a computer program packaging technique which provides reusable and easily expandable programs. In contrast with known functional programming techniques which are not easily adaptable to new functional requirements and new types of data, object oriented programs are reusable and expandable as new requirements arise. With the ever increasing complexity of computer based systems, object oriented programming has received increased attention and investigation.

In an object oriented programming system, the primary focus is on data, rather than functions. Object oriented programming systems are composed of a large number of "objects". An object is a data structure and a set of operations or functions that can access that data structure. The data structure may be represented as a "frame". The frame has many "slots", each of which contains an "attribute" of the data in the slot. The attribute may be a primitive (i.e. an integer or string) or an Object Reference which is a pointer to another object's instance or instances (defined below). Each operation (function) that can access the data structure is called a "method".

Figure 1:
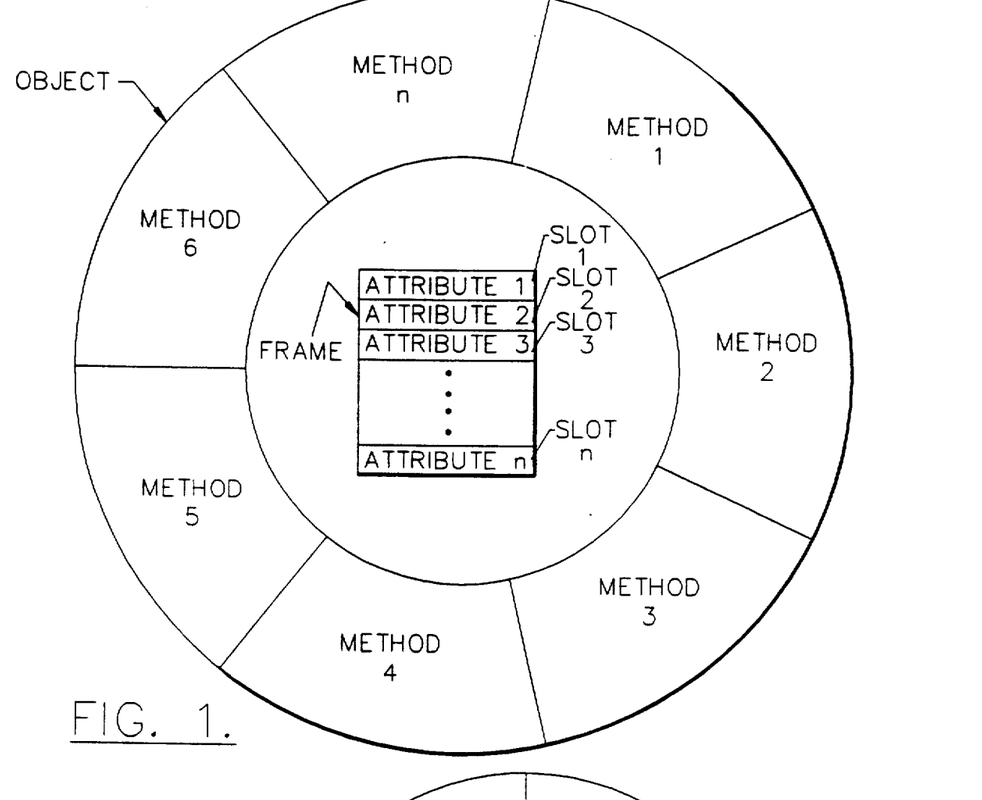
FIG. 1 illustrates a schematic representation of an object.
Figure 2:
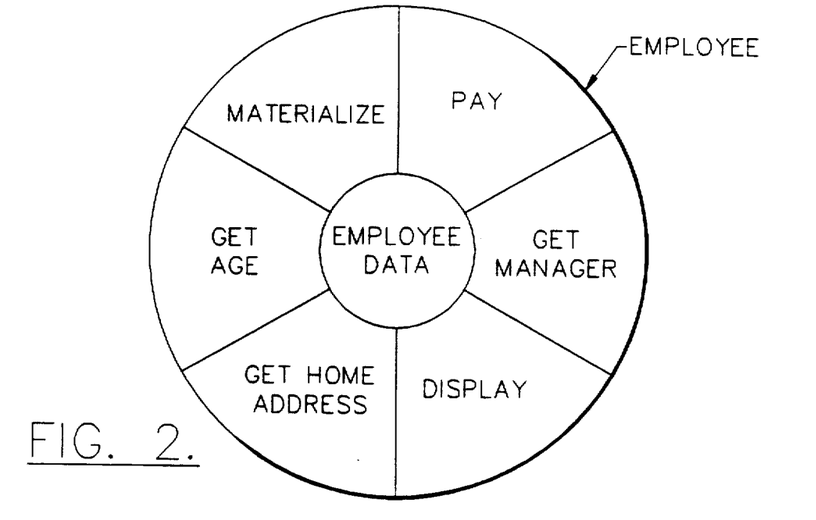
FIG. 2 illustrates a schematic representation of an example of an object.

FIG. 1 illustrates a schematic representation of an object in which a frame is encapsulated within its methods. FIG. 2 illustrates an example of an object, in which the data structure relates to employee data, and a number of methods surround this data structure One method, for example, obtains the age of an employee. Each defined object will usually be manifested in a number of "instances". Each instance contains the particular data structure for a particular example of the object. For example, an object for individual employee named Joyce Smith is an instance of the "employee" object.

Object oriented programming systems provide two primary characteristics which allow flexible and reusable programs to be developed. These characteristics are referred to as "encapsulation" and "inheritance". As may be seen from FIG. 1, the frame is encapsulated by its methods (functions). A wall of code has been placed around each piece of data. All access to the frame is handled by the surrounding methods. Data independence is thereby provided because an object's data structure is accessed only by its methods. Only the associated methods know the internal data structure. This ensures data integrity.

The "inheritance" property of object oriented programming systems allows previously written programs to be broadened by creating new superclasses and subclasses of objects. New objects are described by how they differ from preexisting objects so that entirely new programs need not be written to handle new types of data or functions.

Figure 3:
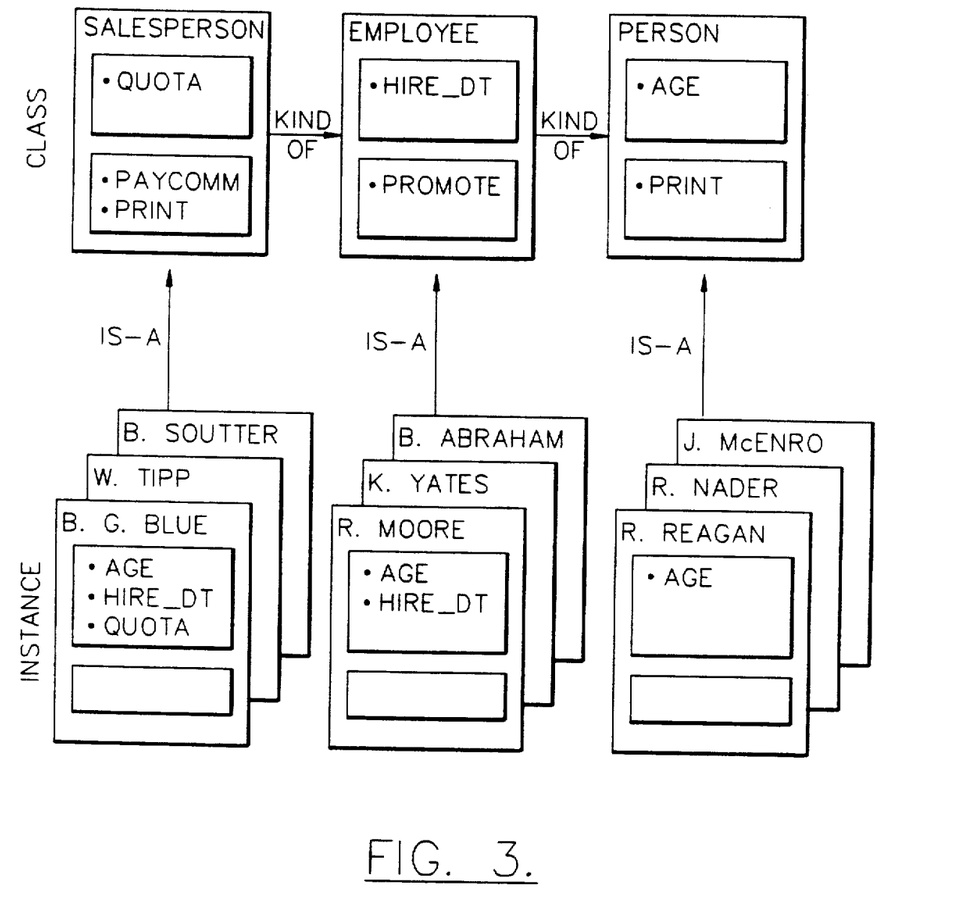
FIG. 3 illustrates the inheritance property of objects.

FIG. 3 illustrates the inheritance property. For ease of illustration, the objects are illustrated as rectangles rather than as circles, with, the object name at the top of a rectangle, the frame below the object name and the methods below the frame Referring to FIG. 3, three object classes are illustrated for "salesperson", "employee" and "person", where a salesperson is a "kind of" employee, which is a "kind of" person. In other words, salesperson is a subclass of employee and employee is the superclass of salesperson. Similarly, employee is the subclass of person and person is the superclass of employee Each class shown includes three instances. B. Soutter, W. Tipp and B. G. Blue are salespersons. B. Abraham, K. Yates and R. Moore are employees J. McEnro, R. Nader and R. Reagan are persons. In other words, an instance is related to its class by an "is a" relation.

Each subclass "inherits" the frame and methods of its superclass. Thus, for example, a salesperson frame inherits age and hire date objects from the employee superclass as well as promote methods from the employee superclass. Salesperson also includes a unique quota attribute and a pay commission method. Each instance can access all methods and frames of its superclass, so that, for example, B. G. Blue can be promoted.

In an object oriented system, a high level routine requests an object to perform one of its methods by sending the object a "message" telling the object what to do. The receiving object responds to the message by choosing the method that implements the message name, executing this method and then returning control to the calling high level routine, along with the results of the method.

Object oriented programming systems may be employed as database management systems which are capable of operating upon a large database, and which are expandable and adaptable In an object oriented database management system, the data in the database is organized and encapsulated in terms of objects, with the instances of the objects being the data in the database. Similarly, the database manager may be organized as a set of objects with database management operations being performed by sending messages from one object to another. The target object performs the requested action on its attributes using its methods.

In an interactive object oriented database management system, a database query typically employs a pair of linked dialogs. The first dialog is an interactive sequence of displays which accept user responses to obtain the information used by the database manager to construct a query. The query is processed to produce a "stream", which is an object class whose attributes comprise the names of all database objects which satisfy the query. In other words, the stream attributes comprise a list of the subset of the object class which meets the search criteria. The first dialog obtains all information needed to build the stream.

Once the first dialog has obtained the necessary information, it requests the query and passes the resulting stream to a second dialog. The second dialog is employed to display the instances whose attributes are in the stream (i.e. to display the query results), and may be employed to modify these instances as well.

As is well known to those having skill in the art, many database queries are time consuming. In order to allow time consuming queries to be run without disabling the entire database management system, it is desirable to run time consuming queries in batch or background mode. However, when queries are run in batch mode, means must be provided to link the batch mode query and its first and second dialogs. For ease of implementation, it is desirable to allow a first dialog to initiate a database query in foreground or background mode, with the query mode being transparent to the second dialog. In other words, the second dialog must process a stream regardless of whether the stream was created in foreground or background mode.

SUMMARY OF THE INVENTION

It is therefore an object of the invention to provide a process and apparatus for performing time consuming queries in an object oriented database management system.

It is another object of the present invention to provide a process and apparatus for performing time consuming queries in background or batch mode.

It is yet another object of the present invention to provide a method and apparatus for interactively displaying query results in a manner which is independent of whether the query was processed in background or foreground mode.

These and other objects are provided by the present invention in an object oriented programming system which includes a database of data objects stored in a data storage device, and an object oriented database manager operating in a data processor. A first dialog is created by an application running in conjunction with, or as part of, the database manager, in order to obtain information regarding a query. The database manager controls processing of the query and produces a stream for the query results, with the stream comprising an object having stream attributes which include a list of the database instances which satisfy the query. A second dialog is also created by application running in conjunction with, or as part of, the database manager, in order to interactively display the stream. According to the invention, the database management system includes a resumeable batch query object class for linking the first and second dialogs to the query. The resumeable batch query object class includes resumeable batch query attributes and methods. The attributes include an identifier of the second dialog and an identifier of the stream for the query. The resumeable batch query methods include a "run" method for processing the query in batch mode.

According to the present invention, when a first dialog obtains the query search criteria, it can determine whether the query will be run in foreground or background mode. This determination may be obtained by asking the user or by determining whether the query will consume excessive time. If the query will be run in foreground mode, the first dialog creates a stream and passes the stream name as the sole parameter to the second dialog. However, if the query is to be run in background mode, the first dialog creates an instance of a resumeable batch query object. The stream name for running the query and the second dialog name are formed as attributes of the resumeable batch query. The first dialog creates a batch job which issues a run message to the resumeable batch query. This causes the query to be executed in batch mode and its results to be saved in the identified stream.

When the batch query is completed, the resumeable batch query instance is placed in the invoking users "in basket", "mail box" or other means for indicating an incoming message. The user may then display the resumeable batch query at his leisure. When displayed, the resumeable batch query object will invoke the second dialog whose name is an attribute thereof, and pass the named stream to the dialog. Accordingly, the second dialog is invoked in a manner identical to a foreground mode query, with no special programming being necessary to handle background queries.

The resumeable batch query of the present invention may be used with a persistent stream, which is a subclass of a stream, and which is described in copending application Ser. No. 07/425,747 filed Oct. 23, 1989 and entitled "Persistent Stream for Processing Time Consuming and Reusable Queries in an Object Oriented Database Management System" the disclosure of which is incorporated herein by reference. Alternatively, a conventional non-persistent stream may be employed for batch and foreground queries.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

OBJECT ORIENTED DATABASE MANAGEMENT SYSTEM

In an object oriented computing system, work is accomplished by sending action request messages to an object which contains (encapsulates) data. The object will perform the requested action on the data according to its predefined methods. The requestor of the action need not know what the actual data looks like or how the object manipulates it.

An object's class defines the types and meanings of the data and the action requests (messages) that the object will honor. The individual objects containing data are called instances of the class. Classes generally relate to real-world things. A later example will use "Parts" as a class. The data elements (slots) of a part might be a part number, a status and a part type The instances of this class represent individual parts, each with its own part number, status, and type information. The programs performing the requested actions are called methods of the class.

Object classes can be defined to be subclasses of other classes. Subclasses inherit all the data characteristics and methods of the part class. They can add additional data and methods, and they can override (redefine) any data elements or methods of the parent class. While most messages are sent to object instances, the message that requests that a new instance be created is sent to an object class. The class will cause a new instance to be created and will return an object identifier by which that object will be known.

The sender of an action request message need not know the exact class of the object to which it is sending the message. As long as the target object either defines a method to handle the message or has a parent class that defines such a method, then the message will be handled using the data in the object instance and the method in its class or its parent class. In fact, it need not be an immediate parent, but may be a parent's parent, etc. The sender of the method need only have the object ID of the receiving object. This property of object oriented programming is called "inheritance". The inheritance property is used in the present invention.

Figure 4:
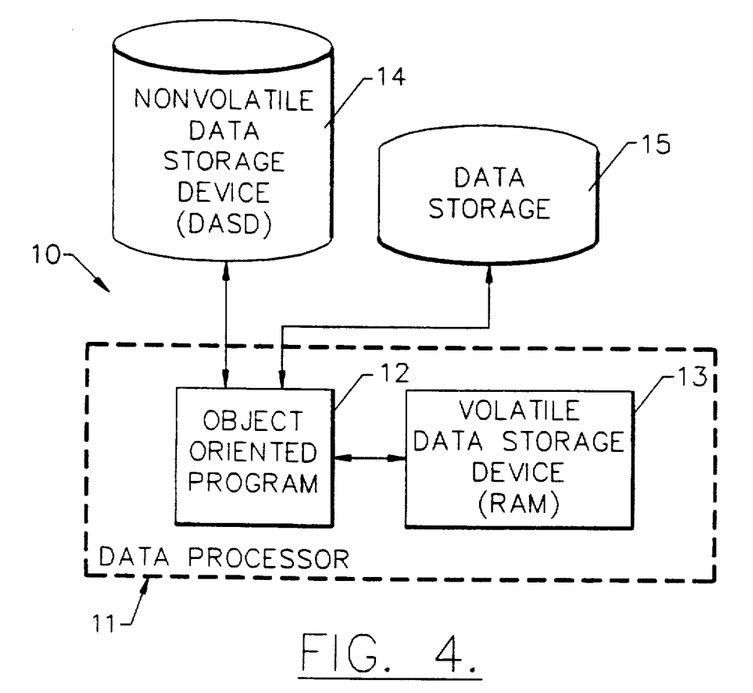
FIG. 4 illustrates a schematic block diagram of an object oriented computer system according to the present invention.

Referring now to FIG. 4, a schematic block diagram of an object oriented database management system 10 is illustrated. The system 10 includes a data processor 11 which may be a mainframe computer, minicomputer or personal computer. For large databases having multiple users, a mainframe computer is typically employed As is well known to those having skill in the art, the data processor 10 includes a volatile data storage device 13, typically random access memory (RAM) for providing a working store for active data and intermediate results. Data in RAM 13 is erased when power to the data processor 11 is removed or a new user session is begun. System 10 also includes a nonvolatile data storage device 14 for permanent storage of objects. Device 14 may be a direct access storage device (DASD-a disk file) a tape file, an erasable optical disk or other well known device. Nonvolatile data storage device 14 will also be referenced to herein as a "database". Volatile data storage device 13 will also be referred to herein as "memory". A display terminal 15 including a cathode ray tube (CRT) or other display, and a keyboard, is also shown.

An object oriented program 12, in the form of an object oriented database manager, is also included in data processor 11. Object oriented database manager may be programmed in object oriented languages such as "C" or "Smalltalk" or variations thereof, or in conventional programming languages such as FORTRAN or COBOL. The design of an object oriented database manager is well known to those skilled in the art of object oriented programming systems, and will only be described generally below.

Figure 5:
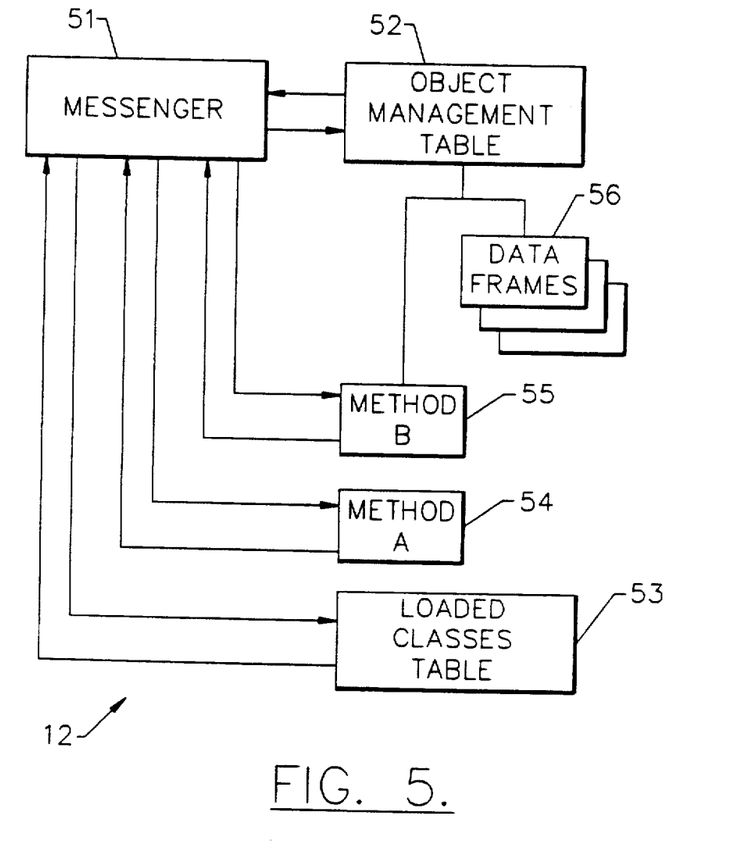
FIG. 5 illustrates a schematic block diagram of an object oriented program according to the present invention.

Referring now to FIG. 5, the main components of an object oriented program (12, FIG. 4) will be described. A more detailed description of the design and operation of an object oriented program is provided in "Object Oriented Software Construction", by Bertrand Meyer, published by Prentice Hall in 1988, the disclosure of which is incorporated herein by reference.

Referring to FIG. 5, object oriented program 12 includes three primary components: a Messenger 51, an Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the Object Oriented Program 12 will now be described for the example illustrated in FIG. 5, in which Method A (block 54) of an object sends a message to Method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

Objects may either be persistent or nonpersistent. A persistent object consists of data that is stored in nonvolatile data storage device 14 and which is brought into processor storage (Ram 13) when it is first referenced by its object ID). It will be written back to the device 14 whenever any method determines that all object data is in a consistent state. This is called "committing" the data. Conventional data base systems, for example IBM's DB2 also include a commit function to assure that all data changes are reflected simultaneously. Persistent objects are described in copending application Ser. No. 07/425,824, filed Oct. 23, 1989 entitled "Persistent Data Interface for Object Oriented Programming System" the disclosure of which is incorporated herein by reference. Non-persistent objects are those whose data need not be saved permanently and therefore are not represented in the DASD 14.

RESUMEABLE BATCH QUERIES

Figure 6:
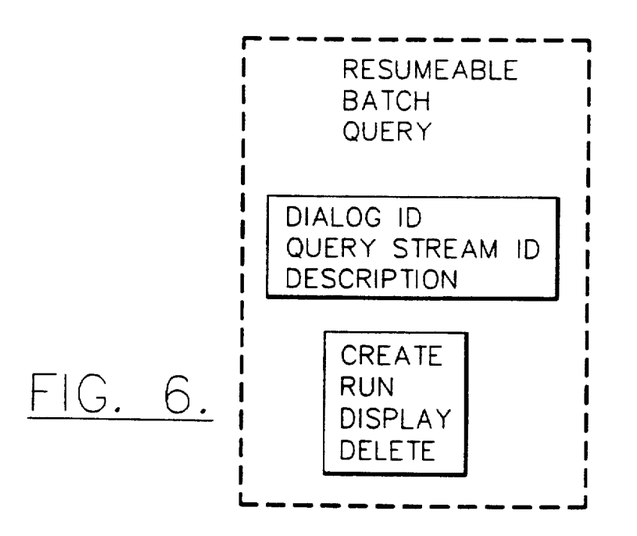
FIG. 6 illustrates the resumeable batch query object of the present invention.

According to the invention, an object is defined known as a "Resumeable Batch Query" object. It encapsulates three data attributes and processes four messages to manipulate the encapsulated data. FIG. 6 graphically illustrates the resumeable batch query object of the present invention. The attributes of the resumeable batch query object are as follows:

Dialog: Identifier of the 'second' dialog panel. This is the dialog panel which is run after the query results are available.

Query Stream: Identifier of an object that contains the search criteria for a query before the query is done, and contains the query results after the query. The Query Stream must respond to a message to produce and save the query results from the search criteria that it contains. One such object is a "persistent stream". The persistent stream will be used hereinafter to describe the present invention. The persistent stream is described in the above-mentioned application Ser. No. 07/425,747. It will be understood by those having skill in the art that a general stream and special programming may also be employed. Whether or not persistent streams are employed, the message to produce and save the query results will be assumed to be named SAVE.

Description: A simple description of the query operation, useful to the terminal user to identify which of many query operations this object represents. For example, the Description might be "All plastic parts released" or "Query done for Fred".

The methods of the Resumeable Batch Query object of the present invention are as follows:

Create: Builds the skeleton of the resumeable batch query object and returns the resumeable batch query identifier to the requester. It receives as parameters the three attributes described above (Dialog, Query Stream, Description). A typical message to request construction of a resumeable batch query is:

*myrbq.CREATE(dialog_vbl,query_vbl, description_vbl)* where the values are as follows:

myrbq: a variable, arbitrarily named "myrbq" for this example, which is declared to be of the class of the resumeable batch query, for example by:

*myrbq: type is Resumeable-Batch-Query;*

The object ID of the newly created resumeable batch query will be placed in this variable.

dialog_vbl: the name of a variable containing the identifier of the panel to invoke with the query results.

query_vbl: the name of a variable containing the identifier of the query_stream which will produce and hold the query results.

description_vbl: the name of a variable containing the text that describes the query. Resumeable batch query object resources, such as the nonvolatile storage to remember the encapsulated data are allocated at this time.

Run: This method runs the batch (background) job. As will be described below, the resumeable batch query is created interactively after the Query Stream has been established. A batch job is submitted whose sole purpose is to send the resumeable batch query the RUN message. The form of the message to RUN the resumeable batch query is:

*myrbq.RUN* where myrbq is a variable containing the object ID returned when the resumeable batch query was created. The Run method sends the SAVE message to the Query Stream whose identifier is encapsulated inside the resumeable batch query. This causes the query to be actually run, producing and saving the query results. This is the main reason for having a resumeable batch query—to move a potentially lengthy query out of the interactive flow. When the Query Stream completes and returns control to this method, this method will then place the resumeable batch query into a list of work for the interactive user to do. While this can be of any form, an object oriented "In Basket" may be provided, similar in concept to a physical "In Basket" on a business person's desk. Objects that are delivered to any particular user are placed in this In Basket, and all delivered objects must support the Display action which is used to 'view' the object. The In Basket will have interactive dialogs that allow users to select an item in the In Basket on which to work, and will allow them to choose a DISPLAY action to show the object. The In Basket dialog will also allow them to choose a DELETE action to discard the object in the In Basket. Thus the RUN method can be said to put the resumeable batch query into the In Basket's queue.

Display: Causes the Resumeable Batch Query to display the target dialog, passing the encapsulated Query Stream as the only parameter. This action is intended to be run from the In Basket interactive dialogs. The form of the message to Display the resumeable batch query is:

*myrbq.DISPLAY* where myrbq is a variable containing the object ID returned when the resumeable batch query was created. As illustrated below, the user will at his leisure choose to see what work is waiting for him by looking in his In Basket. When he chooses a resumeable batch query and specifies the DISPLAY action, this method will receive control. It will obtain the identifier of the panel to process the query from the encapsulated data built by CREATE. It will send the DISPLAY message to that panel, passing the Query stream as the parameter.

Delete: Releases all resources consumed by the Resumeable Batch Query. This includes deletion of the Query Stream. The form of the message to DELETE the resumeable batch query is:

*myrbq.DELETE* where myrbq is a variable containing the object ID returned when the resumeable batch query was created. This method will send a DELETE message to the Query Stream whose identifier is an encapsulated attribute, causing it to free all of its resources. It will then delete all of its own resources and cease to exist. It is assumed this method will be called by the In Basket dialog when a user selects a resumeable batch query and indicates he wishes to delete it.

USE OF THE RESUMEABLE BATCH QUERY

Figure 7:
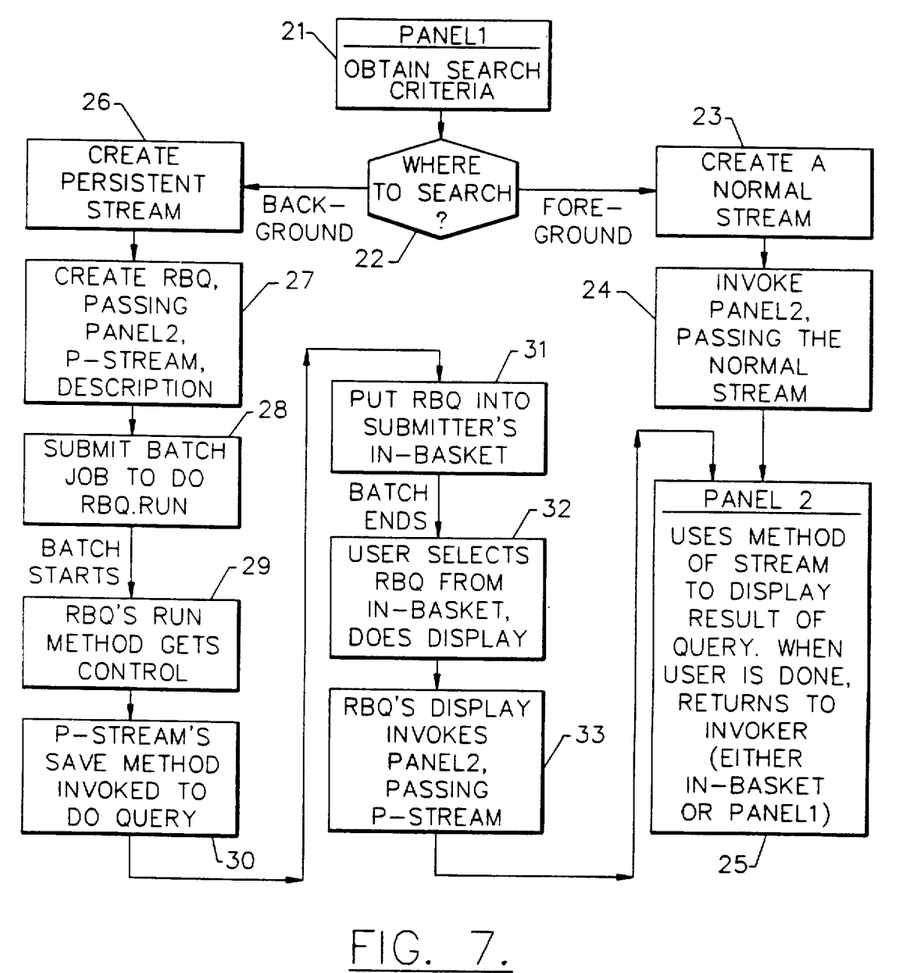
FIG. 7 is a flow chart illustrating operations performed with the resumeable batch query object of the present invention.

Referring now to FIG. 7, a simplified flow chart illustrating use of the resumeable batch query of the present invention will be described. Referring to FIG.

7, a first dialog (PANEL1) obtains the search criteria at block 21. A decision is then made as to where the search is to be performed, at block 22. The decision may be made by asking the user whether the search should be performed in foreground or in background. Alternatively, an estimated search time may be calculated and compared to a predetermined time. If the estimated time is longer than the predetermined time, the search will be performed in background.

If the search is to be performed in foreground, a normal stream is created at block 23, and after the query is performed, a second dialog (PANEL2) is invoked, passing the normal stream as the sole parameter (Block 24). A normal stream is an object that accepts query search criteria when it is crated, and performs the database search as each GET request is made. In contrast, the persistent stream of the present invention performs a database search when its special SAVE method is invoked, and its GET method simply retrieves the next record from a file of saved query results. Users of streams invoke both kinds of streams identically, except that the persistent stream includes the SAVE method in addition to those methods it shares with a normal stream.

If the search is to be performed in Background (Block 22), then the resumeable batch query of the present invention is used. A persistent stream is created (Block 26). A resumeable batch query is CREATE (Block 27). The parameters passed to CREATE are the persistent stream's ID, the second dialog's ID (PANEL2) and a description of the query. The first dialog creates a batch job whose purpose is to issue the RUN message to the resumeable batch query (Block 28) when later scheduled in batch mode (block 29). RUN causes the resumeable batch query to invoke the stream's SAVE method (Block 30), which causes the query to be executed in batch. The query results are saved by the persistent stream.

After the batch query is completed, the RUN method places the resumeable batch query object into the invoking user's In Basket (Block 31). The user may then DISPLAY the resumeable batch query at his leisure (Block 32). The resumeable batch query's DISPLAY method will invoke the dialog (PANEL2) whose identifier was saved therein, and will pass the persistent stream as the only parameter. The second dialog is therefore invoked in an identical manner to the fully interactive case, with minimal specialized code in either dialog to allow the query to run either interactively or in batch.

EXAMPLES

In order to fully describe the detailed operation of the invention to those having skill in the art, two examples will be described. In Example 1, a hypothetical "Mass Update" is shown which runs totally in the interactive environment. This is a simplified flow to show a typical online approach employed by prior art object oriented database management systems. In Example 2, the same "Mass Update" is modified according to the present invention. The query (for example of half a million records) is performed in batch using the Resumeable Batch Query. Then, changes (for example to the chosen 17 records) are specified and made in the interactive session.

In the hypothetical "Mass Update", the first panel dialog asks the user for search criteria so that it can build a list of objects to be updated. It then runs the database query to obtain the list of objects. This step can be quite time consuming if the database is large or the query is complicated or is otherwise not optimal for the database. The query results are passed to a second panel dialog which uses the results to display a list of objects meeting the search criteria. The user then interacts with the second panel dialog to select which objects are to be changed. Finally, the user indicates what changes are to be made to the selected objects and the objects are updated.

Example 1 Mass Update Without Resumeable Batch Query

Figure 8:
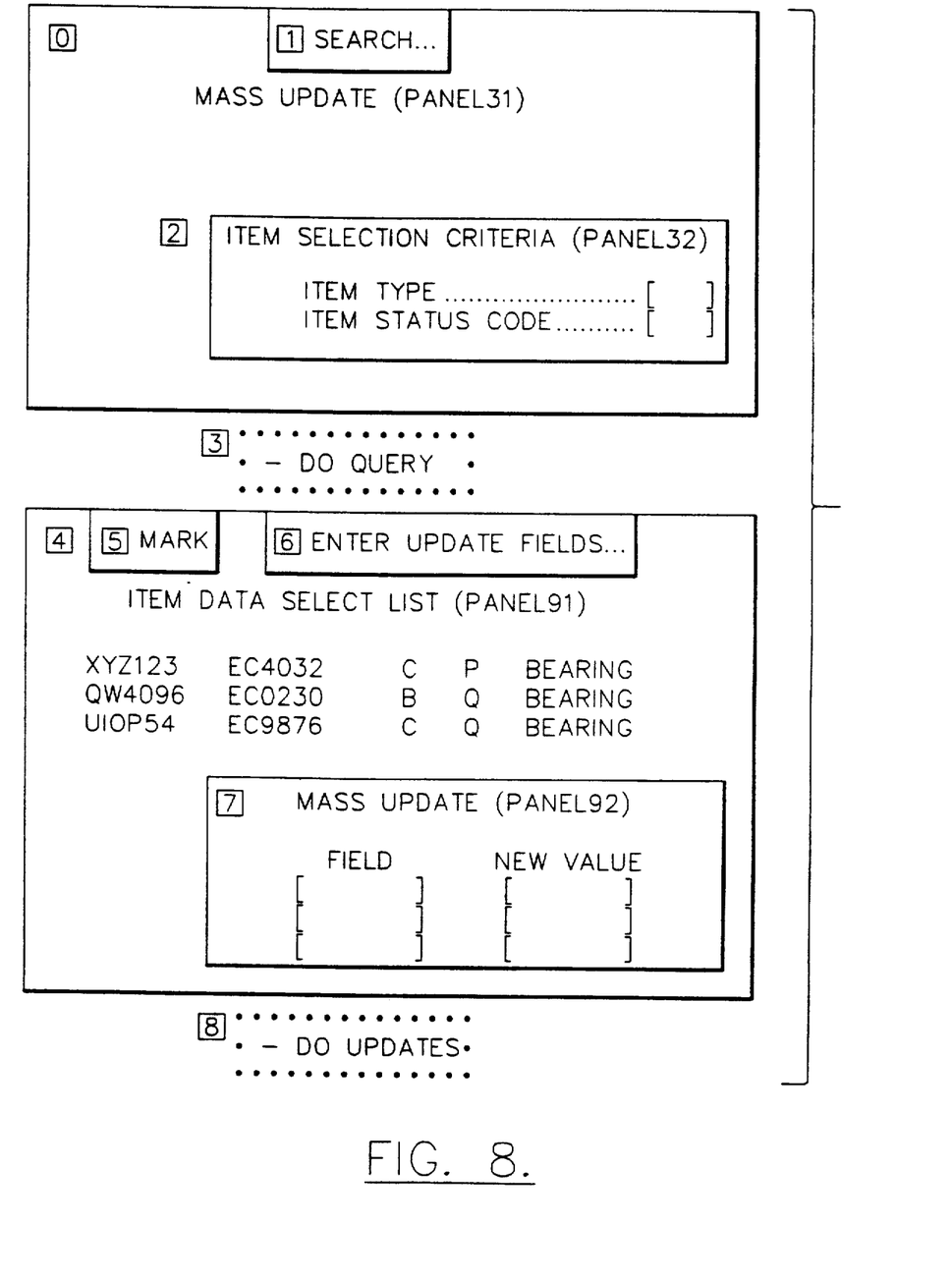
FIG. 8 illustrates a schematic operational flow of a mass update operation which does not employ the resumeable batch query object of the present invention.

For this Example, the entire Mass Update operation is done in an interactive session. This involves choosing items to update, collecting the desired changes, and applying the changes. FIG. 8 illustrates the operational flow of a mass update without the Resumeable Batch Query of the present invention. Referring now to FIG. 8, the online session proceeds in the following sequence:

1. The user has previously chosen the Mass Update option. The dialog will display the Mass Update panel which for this Example is named PANEL31.
2. The user then chooses Search 1 from the action bar.
3. The dialog invokes a sub-dialog to collect the selection criteria. This sub-dialog displays the Selection Criteria panel 2 named PANEL32.
4. The dialog then collects the query criteria.
5. The dialog uses the criteria to create a normal stream. The stream will be of all items satisfying the criteria. The stream may be created as follows:

*mystream = stream.create(criteria)*

6. The first dialog then calls the second dialog which is used to collect the changes to be made and start the update. The next dialog may be called by:

*PANEL91.display(mystream)*

7. The new dialog opens the stream 3 as follows:

*mystream.open*

Database record selection is typically done at this point, and may be time consuming.
8. If the opened stream is empty, then an appropriate message is generated. Otherwise the Item Data Select List panel 4, named (PANEL91) is displayed.
   a. The scrollable list is built by repeatedly using:

*mystream.get* b. By using the Mark action 5, the user selects which of the items that satisfied the query are to be actually changed.
   c. The user next indicates, at 6, that he is ready to make changes to the marked items.
   d. The changes to be made are collected by pop-up panel 7 named PANEL92.
   e. The function is then invoked to make the actual data base changes to the marked items as shown at 8.
9. When PANEL91 is ready to exit, it closes the stream for example by:

*mystream.close* and the previous dialog regains control.

10. For this online example, the previous dialog is the termination code of the pop-up PANEL32 (2). Accordingly, the stream (mystream) is discarded and the process exits to its invoker without redisplaying the popup panel.
11. Its invoker is the dialog for PANEL31 which will either also exit without redisplaying, or may redisplay to allow another Mass Update, depending upon the mass update application design.

Example 2 Mass Update With Resumeable Batch Query

Figure 9:
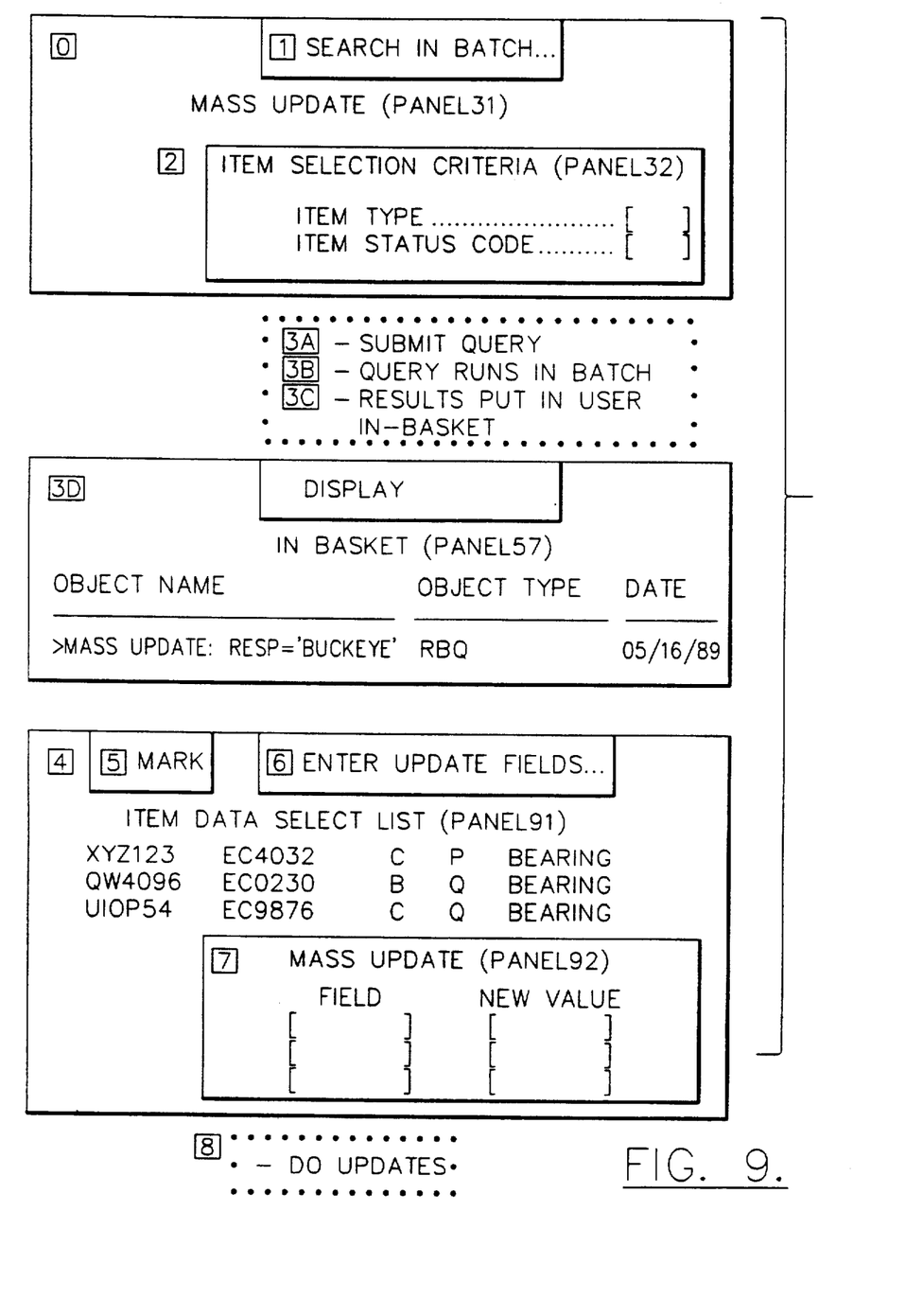
FIG. 9 illustrates a schematic operational flow of a mass update operation which employs the resumeable batch query objects of the present invention.

According to the present invention, the search through the large database is performed in batch, but the remainder of the activity is done in the interactive session. This example uses the Resumeable Batch Query object of the present invention. The Persistent Stream described in copending application Ser. No. 07/425,747 is also used. FIG. 9 illustrates the operational flow of the mass update using the resumeable batch query. Referring to FIG. 9, the mass update proceeds as follows:

1. As in Example 1, the user has previously chosen the Mass Update option. The dialog will display the same Mass Update panel PANEL31.
2. The user chooses Search In Batch (1) from the action bar.
3. The dialog invokes a sub-dialog to collect the selection criteria. This sub-dialog displays the Selection Criteria panel 2, here named PANEL32. An indicator is passed to the new dialog indicating that the search is to be done in batch. This indicator may be generated by PANEL32 displaying another panel asking whether the query is to be in batch on online. Alternatively, a panel asking whether the query is to be performed in batch or online may be displayed when 'Mass Update' was initially chosen. Yet another alternative would be for the system to determine whether the search will be time-consuming, and if so, force the query to batch. For example, an estimated query run time may be computed and compared with a predetermined time. If the estimated time exceeds the predetermined time, a batch update will be invoked.
4. The dialog collects the query criteria.
5. Because the user chose to do the search in the batch mode, the dialog uses the criteria to create a Persistent Stream. The stream will be of all objects satisfying the criteria. The stream may be created by:

*mystream = persistent_stream.create(criteria)*

Creation of a persistent stream involves creating a persistent stream header record and saving the selection criteria for later use.

6. The dialog next creates a Resumeable Batch Query. The resumeable batch query essentially ties together the stream representing the query and a dialog to be run when the query returns from batch.

*myrbq = Resumeable-Batch-Query.create(dialog = - PANEL91, stream = mystream, description = descriptive test)*

The description is used to identify which of possibly many Mass Update searches this one represents. The descriptive text will indicate "Mass Update" and the selection criteria.

7. The dialog now creates a batch job 3A. The object and method to perform in batch is:

*myrbq.RUN*

8. The dialog now returns to its invoker, which was the dialog for PANEL31.

At this point, the user is free to do any other work he desires. The action for this Mass Update is performed later, in batch.

9. The batch job is scheduled by the operating system. The batch processor finds the object method to be run which in this example is the RUN method of the resumeable batch query identified by 'myrbq' 3B.
   a. 'myrbq.run' does a 'mystream.save', using the stream id that is part of the resumeable batch query.
      1) The persistent stream SAVE method does the equivalent of 'mystream.get' and writes the results to a temporary file that it creates.
      2) The "get" continues until end-of-file is reached on the query.
      3) Finally, the ID of the temporary file is saved in mystream's header, and processing returns to its invoker.
   b. The resumeable batch query 'run' method now places the resumeable batch query object into the user's In-Basket and returns to its invoker at 3C.

The batch job has now completed. At some point the user will choose to go to his In-Basket to process batch results.

10. The user goes to the In-Basket display at 3D.
11. The user selects the resumeable batch query entry and selects File.Display.
12. In-Basket invokes the DISPLAY method of the resumeable batch query instance.
    a. The resumeable batch query DISPLAY method invokes the dialog identified in the resumeable batch query, passing it to the persistent stream identified in the resumeable batch query. The call may be:

*PANEL91.display(mystream)*

At this point, the flow picks up in Example 1 at step 7 and continues through step 9 of Example 1. When step 9 is reached, processing continues with step 12C of the present Example below. It should be noted that when a persistent stream is OPENed, it simply uses the temporary file as its source and uses it to provide the same output to GET as a normal stream would. Thus, the interactive data accesses are only to fetch records already determined to be the proper ones. The time-consuming selection activity ha already occurred in batch. As an extension, in the case that a persistent stream is OPENed before its SAVE method is run, it may simply do the query in realtime like a normal stream. It will also be noted that persistent streams can be closed and re-opened, just like normal streams. The temporary file is simply re-read.

c. When PANEL91 exits to its invoker for this case, it exits to the In-Basket panel.
13. The user may do additional Display's of this same resumeable batch query if he wishes.
14. The user eventually deletes the resumeable batch query from his In-Basket using the File.Delete action. invokes mystream.Delete. Mystream.Delete deletes both the persistent stream header and temporary file.
15. The user is then free to continue in his In-Basket or go elsewhere in the application.

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim is:

1. An object oriented database management system for performing a query in background mode and for linking results of the background mode query for display, comprising:
    a data storage device;
    input means;
    display means;
    a database of data objects stored in said data storage device;
    a data processor connected to said data storage device;
    incoming message indicating means executing in said data processor for displaying an incoming message indicator on display means;
    a first dialog executing in said data processor, for accepting information from said input means regarding a query to be performed on said database;
    means executing in said data processor, and responsive to said first dialog, for determining that said query is to be performed in background mode;
    means, executing in said data processor, and responsive to said determining means, for performing said query on said database in background mode to produce a stream, said stream comprising an object having a plurality of stream attributes including a list of data objects which result from said query performed in background mode;
    a second dialog executing in said data processor, for displaying said stream on said display means;
    a resumeable batch query object executing in said data processor for linking said second dialog and said stream, said resumeable batch query object including resumeable batch query attributes and at least one resumeable batch query method, said resumeable batch query attributes comprising an identifier of said second dialog and an identifier of said stream produced by said query performed in background mode; and
    means, executing in said data processor, for providing said resumeable batch query object to said incoming message indicating means, to notify said incoming message indicating means that said query has been performed.

2. The object oriented database management system of claim 1 wherein said at least one resumeable batch query method comprises means for activating said performing means.

3. The object oriented database management system of claim 2 wherein said at least one resumeable batch query method further comprises means for providing said identifier of a stream to said second dialog.

4. The object oriented database management system of claim 1 wherein said determining means comprises means for accepting an indication that said query is to be performed in background mode.

5. The object oriented database management system of claim 1 wherein said determining means comprises means for accepting an indication from said first dialog that said query is to be performed in background mode.

6. The object oriented database management system of claim 1 wherein said determining means comprises means for estimating the time required for performing said query and means for determining that said query is to be performed in background mode if the estimated time exceeds a predetermined time.

7. A process for linking a first dialog for accepting information regarding a first query to be performed on a database, and a second dialog for displaying results of the first query, in an object oriented database management system comprising a data storage device having a database of data objects stored therein and a data processor connected to said data storage device and having an object oriented database manager operating therein for performing queries of said database, said linking process comprising the following steps performed on said data processor:
    producing a first stream for said first query in background mode, said first stream comprising an object having a plurality of stream attributes including a list of data objects which result from the first query performed in background mode; and
    linking said second dialog and said first stream produced in background mode with a resumeable batch query object which includes resumeable batch query attributes and at least one resumeable batch query method, the resumeable batch query attributes comprising an identifier of said second dialog and an identifier of said first stream produced in background mode.

8. The process of claim 7 wherein said linking step is followed by the step of indicating that said query has been performed.

9. The process of claim 8 wherein said indicating step comprises the step of: placing the instance of the resumeable batch query in an incoming message indicating means.

10. The process of claim 7 wherein the at least one resumeable batch query method comprises a method for causing aid producing step to perform said first query.

11. A process for performing a query of a database of data objects in an object oriented database management system, comprising a data storage device having a database of data objects stored therein and a data processor connected to said data storage device and having an object oriented database manager operating therein for performing queries of said database, said query performing process comprising the following steps performed by said data processor:
    obtaining search criteria for said query;
    determining whether said query is to be performed in background mode; and
    performing the following steps if said query is to be performed in background mode;
        creating a stream comprising an object having a plurality of stream attributes including a list of data objects which result from said query;
        creating a resumeable batch query object comprising resumeable batch query attributes, the resumeable batch query attributes comprising an identifier of said stream;
        performing said query in background mode; and
        placing said resumeable batch query object in an incoming message indicating means after said query has been performed.

12. The process of claim 11 wherein the following steps are performed if said query is not to be performed in background mode:

creating a stream comprising an object having a plurality of stream attributes including a list of data objects which result from said query; and immediately performing said query.

13. The process of claim 11 wherein said obtaining step comprises the step of providing a first dialog for obtaining said search criteria for said query.

14. The process of claim 11 wherein said determining step comprises the step of accepting an indication that said query is to be performed in background mode.

15. The process of claim 11 wherein said determining step comprises the steps of:

estimating the time required for performing said query, and determining that said query is to be performed in background mode if the estimated time exceeds a predetermined time.

16. The process of claim 11 wherein said incoming message indicating means comprises a mailbox.

17. The process of claim 11 wherein said resumeable batch query attributes further comprise an identifier of a second dialog for processing said list of data objects resulting from said query; and wherein said placing step is followed by the step of invoking said second dialog for processing said list of data objects.

* * * * *